Patented July 12, 1949

2,475,580

UNITED STATES PATENT OFFICE 2,475,580

KETO THIOPHANES AND METHOD OF PREPARING SAME

Bernard R. Baker, Nanuet, N. Y., assignor, by mesne assignments, to American Cyanamid Company, New York, N. Y., a corporation of Maine No Drawing. Application June 21, 1945, Serial No. 600,830

3 Claims. (Cl. 260—329)

The present invention relates to thiophanes and to methods of preparing the same.

I have found that I can prepare certain types of thiophanes by condensing a mono- or dicarboxylic thio ester with an unsaturated mono- or dicarboxylic acid ester in accordance with the following general equation:

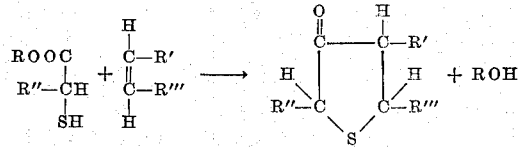

wherein R is alkyl, R' is carbalkoxy and R'' and R''' are hydrogen, alkyl, phenoxyalkyl, carboxyalkyl and carbalkoxyalkyl. When in the above equation either R'' or R''' or both are phenoxyalkyl I intend to include substituted phenoxyalkyls, such as chlorophenoxyalkyls, bromophenoxyalkyls, nitrophenoxyalkyls, etc.

In carrying out my invention a large number of mono- and dicarboxylic thio esters can be used as intermediates, the principal requirement being that the thio group is attached to a carbon atom adjacent to a carbonyl group. Among these may be specifically mentioned: ethyl thioglycolate, methyl thioglycolate, ethyl alpha-thiopropionate, methyl alpha-thiopropionate, ethyl alpha-thiobutyrate, methyl alpha-thiovalerate, ethyl alpha-thiocaproate, methyl alpha-thiocaprylate, ethyl alpha-thiosuccinate, methyl alpha-thioglutarate, ethyl alpha-thioadipate, methyl alpha-thiopimelate, ethyl 2-mercapto-5-phenoxyvalerate, methyl-2-mercapto-5-chlorophenoxyvalerate, and the like.

Similarly, a number of unsaturated esters may be used as the second intermediate in preparing the thiophanes of the present invention. Among these may be mentioned: ethyl acrylate, methyl acrylate, ethyl crotonate, methyl crotonate, ethyl maleate, methyl maleate, ethyl-2-octenoate, ethyl-2-butenoate, ethyl-2-pentenoate, methyl-2-hexenoate, ethyl-2-hexenoate, methyl-6-phenoxy-2-hexenoate, ethyl 7-carbethoxy-2-heptenoate, and the like.

Many of the thiophanes which can be prepared by means of the present invention are new compounds. These may be illustrated by the following general formula:

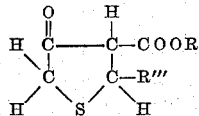

wherein R and R''' are as defined above.

In preparing thiophanes by the process of the present invention I prefer to dissolve the thio ester and the unsaturated ester in an inert solvent such as benzene, ether, dioxane, etc. A strongly alkaline substance such as an alkali metal, alkali metal alcoholate, alkali metal amide, etc. is added to the reaction mixture and serves as a catalyst for the reaction. The mixture is kept under anhydrous conditions.

When in preparing the new compounds of the present invention wherein R'' is hydrogen and R''' is alkyl, phenoxyalkyl, etc. I prefer to carry out the reaction at temperatures of from about 60° to about 120° C. When R'' is alkyl, phenoxyalkyl, etc. and R''' is hydrogen I prefer to carry out the reaction at temperatures of about 10° to about 40° C., although, temperatures as high as 120° C. may be used in the reaction. The reaction may require from about 1 hour to about 30 hours to complete, but more usually from 2 to about 5 hours.

When the reaction is complete the products can be recovered from the reaction mixture by acidifying, washing with water, and fractionally distilling the product. I prefer, however, to recover the product by extracting the reaction mixture with ice water and iced aqueous solution of an alkali such as, potassium hydroxide. The aqueous extracts are then acidified and the oil which separates is extracted with a water immiscible solvent such as benzene. This extract is then fractionally distilled to give a pure product.

These compounds are useful as intermediates in the preparation of antivitamins and vitamins such as biotin.

It will be understood that various modifications may be made in the specific procedures described without departing from the scope of the invention.

Example 1

To the dry sodium ethylate from 5.8 g. of sodium obtained by evaporating the alcoholic solution to dryness in vacuo was added in a nitrogen atmosphere 27.5 g. of ethyl thioglycolate in 50 cc. of benzene followed by 33.6 g. of ethyl 2-hexenoate in 25 cc. of benzene. After being refluxed for three hours, the solution was extracted with ice water and iced 3% sodium hydroxide. The aqueous extracts were acidified and extracted with benzene. Distillation gave 33.5 g. (68%) of 2-propyl-3-carbethoxy-4-ketothiophane, as an oil, boiling point 109°–111° C. (1 mm.).

Example 2

To the dry sodium methylate from 2 g. of sodium obtained by evaporating its methanolic solution to dryness in vacuo was added 7 g. of methyl thioglycolate and 13.6 g. of methyl 6-phenoxy-2-hexenoate in 50 cc. of benzene. After being refluxed for two and one-half hours, the solution was extracted with iced water and iced 3% sodium hydroxide. Acidification gave an oil which was extracted with benzene, washed with water and evaporated to dryness in vacuo. The product, 2-(gamma-phenoxypropyl) - 3 - carbomethoxy-4-ketothiophane, was obtained as an orange oil, yield 14.7 g. (81%).

Example 3

A mixture of 33.5 g. of 2-propyl-3-carbethoxy-4-ketothiophane, 150 cc. of water, 21 cc. of concentrated sulfuric acid and 40 cc. of acetic acid was refluxed six hours. The cooled mixture was extracted with benzene, washed with dilute alkali and water, then distilled. The product, 2-propyl-4-ketothiophane, was obtained as a colorless oil, boiling point 98° C. (12 mm.). A yield of 17.8 g. (80%) was obtained.

Example 4

A mixture of 2 g. of 2-(gamma-phenoxypropyl) 3-carbomethoxy-4-ketothiophane, 4 cc. of acetic acid, 16 cc. of water and 2 cc. of concentrated sulfuric acid was refluxed five hours. The cooled mixture was extracted with ether, washed with dilute alkali and water. After removal of the solvent the residue was crystallized from petroleum ether. Two recrystallizations of the product, 2-(gamma-phenoxypropyl)-4-ketothiophane, from petroleum ether gave white crystals, melting point 59°–61° C.

Example 5

To the dry sodium methoxide from 1.4 g. of sodium obtained by evaporating its methanolic solution to dryness in vacuo was added 8.4 g. of methyl alpha-mercaptoadipate and 4.5 cc. of methyl acrylate in 25 cc. of benzene. After being refluxed for two hours, the mixture was cooled in ice, diluted with ether, then extracted with ice water and iced 3% sodium hydroxide. Acidification gave 2-(gamma-carbomethoxypropyl)-3-keto-4-carbomethoxythiophane which was extracted with benzene. Evaporation in vacuo gave an oil, yield 8.3 g. The product was characterized by hydrolysis to 2-(gamma-carboxypropyl)-3-ketothiophane.

Example 6

To 25.3 g. of methyl 2-mercapto-5-phenoxyvalerate and 0.2 cc. of piperidine was added 13 cc. of methyl acrylate in portions with ice cooling so that the temperature was 40°–50° C. After five hours at room temperature, the mixture was dissolved in 150 cc. of dry ether and added to the dry sodium methylate from 2 g. of sodium obtained by evaporating its methanolic solution to dryness in vacuo. The nearly clear solution was allowed to stand at room temperature, protected from moisture for sixteen hours. The ether solution was extracted three times with ice water and the extracts immediately run into iced hydrochloric acid. A benzene extract of the oil which had separated was washed twice with dilute sodium bicarbonate, water, and then evaporated to dryness in vacuo. The product, 2-(gamma-phenoxypropyl)-3-keto-4 - carbomethoxythiophane, was obtained as an orange-yellow oil which gave a purple color with alcoholic ferric chloride. The yield was 22.7 g. (73%).

Example 7

From 15.5 g. of methyl 2-mercapto-5-chlorophenoxyvalerate, 3 cc. of methyl acrylate and the dry sodium methylate from 1.2 g. of sodium was obtained 14.7 g. (80%) of 2-gamma-chlorophenoxypropyl)-3-keto-4-carbo - methoxythiophane in the same manner as described in Example 6 for 2(gamma-phenoxypropyl)-3-keto-4-carbomethoxythiophane.

Example 8

A mixture of 8.3 g. of 2(gamma-carbomethoxypropyl)-3-keto-4-carbomethoxy thiophane (prepared as in Example 5) and 100 cc. of 10% sulfuric acid was refluxed for ten hours, saturated with sodium chloride and extracted twice with ethyl acetate. Evaporation gave, 2-(gamma-carboxypropyl)-3-ketothiophane, as an oil, which was crystallized from benzene. A yield of 2.6 g. melting at 72°–73° C. was obtained.

Example 9

To dry sodium ethylate from 26 g. of sodium and 500 cc. of absolute ethanol obtained by evaporating the solution to dryness in vacuo was added 350 cc. of benzene and 112 cc. (120 g.) of ethyl thioglycolate. The mixture was then heated to boiling and 180 g. of ethyl maleate was added at such a rate that the mixture refluxed spontaneously (five minutes). After being refluxed two hours, the solution was poured on ice and ether. The aqueous layer was immediately run into dilute acetic acid and the organic layer extracted four times with ice water (a total of 3 liters). The combined acidified aqueous mixture was extracted with benzene, washed with water, aqueous sodium bicarbonate and water. Distillation gave a colorless oil, boiling point 135°–139° C. (1 mm.), which turned yellow on standing. A yield of 127 g. (52%) of 2,3-dicarbethoxy-4-ketothiophane was obtained. The compound gave a wine-red color with alcoholic ferric chloride.

Example 10

A mixture of 24 g. of 2,3-dicarbethoxy-4-ketothiophane and 150 cc. of 10% sulfuric acid was refluxed five hours. The clear yellow solution was saturated with ammonium sulfate and extracted twice with ethyl acetate. Evaporation gave a quantitative yield of crude product. Recrystallization from toluene gave 12 g. (84%) of white crystals of 4-ketothiophane-2-carboxylic acid, melting at 132°–134° C.

Example 11

To the dry sodium ethylate from 0.95 g. of sodium was added 2.7 cc. of ethyl thioglycolate in 8 cc. of benzene and 6.2 g. of ethyl 7-carbethoxy-2-heptenoate in 7 cc. of benzene. The cooled solution, after being refluxed for four hours, was extracted with ice water and the extracts acidified. The oil was extracted with benzene, washed with aqueous sodium bicarbonate and water. Evaporation gave a yield of 3.8 g. (46%) of 2-(delta-carbethoxybutyl)-3-carbethoxy-4-ketothiophane as an oil. The product was characterized as its crystalline semicarbazone, melting point 130°–133° C.

Example 12

To a suspension of 20 g. of sodium methoxide in 150 cc. of benzene was added 22 cc. of methyl thioglycolate followed by 27.7 g. of methyl glutaconate in 50 cc. of benzene. The mixture was refluxed for two hours during which time an oil separated. The mixture was cooled in ice and extracted twice with iced water, the extracts being immediately run into dilute hydrochloric acid. The oil was extracted with benzene, washed with aqueous sodium bicarbonate and water, then evaporated in vacuo. A yield of 21.6 g. (53%) of 2-carbomethoxymethyl-3-carbomethoxy-4-ketothiophane was obtained as an orange colored oil. The oil gave a purple ferric chloride test.

I claim:
1. A method of preparing 2-(delta-carbethoxybutyl) - 3 - carbethoxy-4-ketothiophane which comprises heating ethyl thioglycolate with ethyl 7-carbethoxy-2-heptenoate in the presence of sodium ethylate and a suitable solvent.
2. A method of preparing compounds corresponding to the general formula:

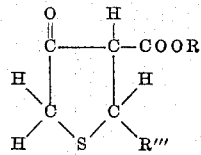

wherein R is an alkyl radical and R''' is a carbalkoxyalkyl radical which comprises heating an alkyl ester of thioglycollic acid with a compound having the formula:

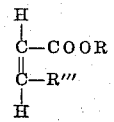

wherein R and R''' are as defined above, in the presence of a compound selected from the group consisting of alkali metals, alkali metal alcoholates and alkali metal amides and an inert organic solvent.
3. A method of preparing 2-carbomethoxymethyl-3-carbomethoxy-4-keto thiophane which comprises heating methyl thioglycolate with methyl glutaconate in the presence of sodium methoxide and a suitable solvent.

BERNARD R. BAKER.

REFERENCES CITED

The following references are of record in the file of this patent:

UNITED STATES PATENTS

| Number | Name | Date |
|---|---|---|
| 2,416,100 | Karrer | Feb. 18, 1947 |
| 2,417,326 | Schnider | Mar. 11, 1947 |
| 2,418,923 | Bernstein | Apr. 15, 1947 |
| 2,424,007 | Moore | July 15, 1947 |
| 2,438,807 | Karrer | Mar. 30, 1948 |

FOREIGN PATENTS

| Number | Country | Date |
|---|---|---|
| 567,438 | Great Britain | Feb. 19, 1945 |
| 66,563 | Norway | Aug. 2, 1943 |